(12) United States Patent
Kneckt

(10) Patent No.: US 10,104,659 B2
(45) Date of Patent: *Oct. 16, 2018

(54) METHOD AND APPARATUS FOR WIRELESS NETWORKS

(71) Applicant: Nokia Technologies Oy, Espoo (FI)

(72) Inventor: Jarkko Lauri Sakari Kneckt, Espoo (FI)

(73) Assignee: Nokia Techologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/192,166

(22) Filed: Jun. 24, 2016

(65) Prior Publication Data

US 2016/0309474 A1  Oct. 20, 2016

Related U.S. Application Data

(63) Continuation of application No. 13/816,277, filed as application No. PCT/FI2010/050650 on Aug. 18, 2010, now Pat. No. 9,408,187.

(51) Int. Cl.
| | |
|---|---|
| *H04Q 7/00* | (2006.01) |
| *H04W 72/04* | (2009.01) |
| *H04W 72/02* | (2009.01) |
| *H04L 12/721* | (2013.01) |
| *H04W 48/18* | (2009.01) |
| *H04W 48/16* | (2009.01) |
| *H04W 84/12* | (2009.01) |
| *H04W 84/18* | (2009.01) |

(52) U.S. Cl.
CPC ......... *H04W 72/0446* (2013.01); *H04L 45/44* (2013.01); *H04W 48/18* (2013.01); *H04W 72/02* (2013.01); *H04W 72/04* (2013.01); *H04W 48/16* (2013.01); *H04W 84/12* (2013.01); *H04W 84/18* (2013.01)

(58) Field of Classification Search
CPC .......................... H04W 72/02; H04W 72/04
USPC ........ 370/328, 329, 437, 229, 228, 338, 447
See application file for complete search history.

(56) References Cited

U.S. PATENT DOCUMENTS

| | | | | |
|---|---|---|---|---|
| 8,121,057 | B1 * | 2/2012 | Botha | H04L 12/1827 370/270 |
| 9,209,881 | B2 * | 12/2015 | Srinivasa | H04B 7/0434 |
| 9,408,187 | B2 * | 8/2016 | Kneckt | H04W 72/02 |
| 9,629,128 | B2 * | 4/2017 | Srinivasa | H04B 7/0434 |
| 2009/0168706 | A1 * | 7/2009 | Avonts | H04W 16/30 370/329 |
| 2009/0268692 | A1 * | 10/2009 | Haartsen | H04B 1/7107 370/335 |

(Continued)

*Primary Examiner* — Chuong T Ho (74) *Attorney, Agent, or Firm* — Banner & Witcoff, Ltd.

(57) ABSTRACT

In a non-limiting and exemplary embodiment, a method is provided for arranging multi-channel wireless communications, comprising: determining a first dedicated channel for a first apparatus from a set of channels, receiving an indication of a second dedicated channel for a second apparatus, and communicating with the second apparatus on the first dedicated channel and on the second dedicated channel, wherein a first communications event on the first dedicated channel and a second communication event at the second dedicated channel are carried out at least partially simultaneously.

20 Claims, 3 Drawing Sheets

(56) References Cited

U.S. PATENT DOCUMENTS

| | | | | |
|---|---|---|---|---|
| 2009/0323608 A1* | 12/2009 | Adachi | ................ | H04W 48/18 |
| | | | | 370/329 |
| 2010/0014502 A1* | 1/2010 | Singh | ...................... | H04B 7/12 |
| | | | | 370/343 |
| 2011/0310827 A1* | 12/2011 | Srinivasa | ............ | H04B 7/0434 |
| | | | | 370/329 |
| 2012/0134301 A1* | 5/2012 | Botha | ................ | H04L 12/1827 |
| | | | | 370/260 |
| 2016/0088606 A1* | 3/2016 | Srinivasa | ............ | H04B 7/0434 |
| | | | | 370/329 |

* cited by examiner

METHOD AND APPARATUS FOR WIRELESS NETWORKS

RELATED APPLICATIONS

This application is a continuation application of U.S. patent application Ser. No. 13/816,277 filed Feb. 11, 2013, which is a 371 national stage entry of international application no. PCT/FI2010/050650 filed Aug. 18, 2010, each of which is incorporated herein by reference in its entirety.

FIELD

The exemplary and non-limiting embodiments of this invention relate generally to wireless networks, and more specifically to channel selection in wireless networks.

BACKGROUND

Wireless local area networks (WLANs) are very widely used for wireless local connectivity and Internet access. In typical WLAN deployments, stations (STAs) must associate with an access point (AP) in order to gain access to a network. These STAs are dependent on the AP with which they are associated to communicate.

More flexible wireless connectivity is enabled by mesh networks, such as IEEE 802.11s based mesh networks and various other ad-hoc networks. Wireless links or multi-hop paths between multiple mesh STAs or APs can be established to replace AP-STA distribution. Devices traditionally categorized as clients can benefit from the larger multihop coverage, ability to establish peer-to-peer wireless links with neighboring clients and APs in a mesh network.

SUMMARY

Various aspects of examples of the invention are set out in the claims.

According to a first embodiment, there is provided a method, comprising: determining a first dedicated channel for a first apparatus from a set of channels, receiving an, indication of a second dedicated channel for a second apparatus, and communicating with the second apparatus on the first dedicated channel and on the second dedicated channel, wherein a first communications event on the first dedicated channel and a second communication event at the second dedicated channel are carried out at least partially simultaneously.

According to a second embodiment, there is provided an apparatus comprising at least one processor and at least one memory including computer program code, the at least one memory and the computer program code configured to, with the at least one processor, cause the apparatus at least to perform: determine a first dedicated channel for a first apparatus from a set of channels, receive an indication of a second dedicated channel for a second apparatus, and communicate with the second apparatus on the first dedicated channel and on the second dedicated channel, wherein a first communications event on the first dedicated channel and a second communication event at the second dedicated channel are carried out at least partially simultaneously.

The invention and various embodiments of the invention provide several advantages, which will become apparent from the detailed description below.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
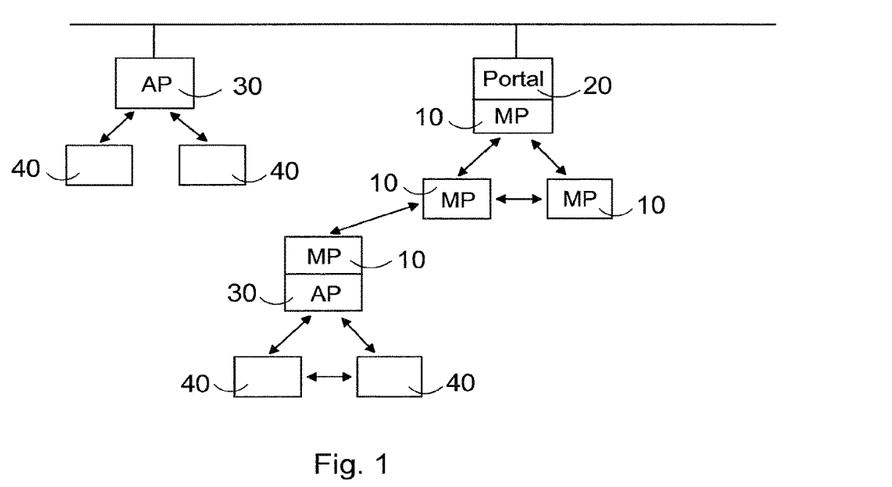
FIG. 1 illustrates a wireless networking system.

FIG. 1 illustrates an example of a wireless networking system including elements capable of mesh networking, such as elements supporting IEEE 802.11s Features. However, it will be appreciated that the application of the present features is not limited to any specific network type(s), such as mesh networks.

Mesh points (MPs) 10 are entities that support mesh services, i.e., they participate in the formation and operation of the mesh network. The MPs 10 perform mesh functionalities such as path selection and forwarding, etc.

FIG. 1 also illustrates a non-mesh network portion, in which wireless terminals 40 are wirelessly connected to and associate with an access point (AP) or base station 30 in order to gain access to the network. For instance, the terminals may be IEEE 802.11 WLAN stations (STA) which need to perform an association procedure to exchange data with WLAN APs. WLAN APs may also be inter-connected.

An MP may be collocated with one or more other entities, such as an access point 30, gate or portal 20, etc. The configuration of an MP that is collocated with an access point 30 may be referred to as a Mesh Access Point (MAP). Such a configuration allows a single entity to logically provide both mesh functionalities and AP functionalities simultaneously. Mesh portals 20 (MPPs) interface to other networks, such as IEEE 802 LAN segments.

Mesh networking provides D2D networking principle that is capable to forward traffic over multiple hops. A mesh network, such as an IEEE 802.11s mesh basic service set (BSS), consists of multiple peerings that enable data transmission between the peer devices. However, in some mesh networks, such as mesh networks according to the current IEEE 802.11s operating over 802.11n MAC, all devices in the mesh network operate in the same operating channel. The use of the same operation channel may congest the media and cause degradation of the mesh network throughput.

Figure 2:
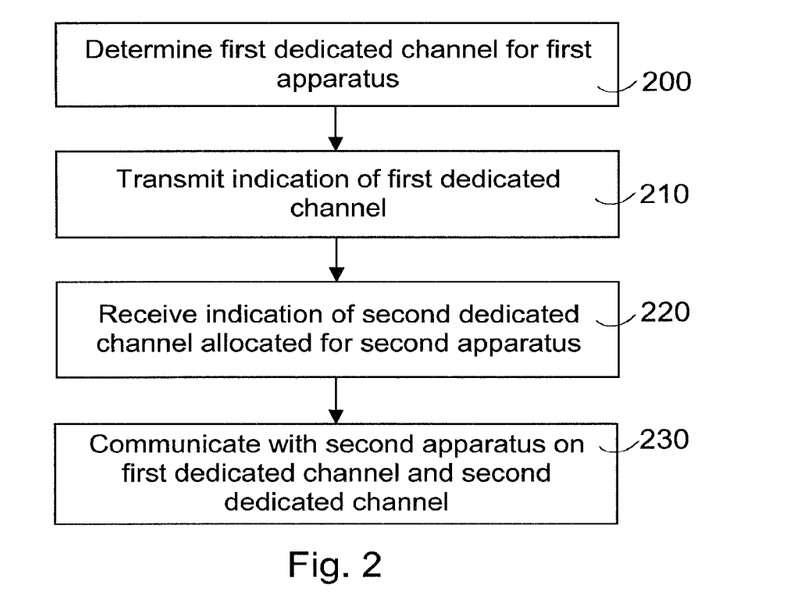
FIG. 2 illustrates a method according to an embodiment.

According to example embodiments of the invention, and as illustrated also in FIG. 2, a dedicated channel may be determined 200 for each wireless communication apparatus, such as a mesh point 10 of FIG. 1. The dedicated channel may be dynamically selected from a set of currently available channels during initiation of a mesh network, for instance. The dedicated channel may be determined on the basis of sensed channel utilization, for instance. The term "dedicated channel" refers generally to a channel selected for transmitting and/or receiving user and/or signalling data. In case of an IEEE WLAN, a dedicated channel is a frequency channel in which a WLAN radio device performs contention-based access to the wireless medium and in which it may receive transmissions.

It is to be noted that the communication apparatus may use further channels, which may be referred to as secondary channels. However, secondary channels are not used alone, but always in addition to dedicated channel. In some cases the dedicated channel may be used for signalling some control information that is common for both the dedicated channel and the secondary channel that is not transmitted on the secondary channel. Similarly, the dedicated and secondary channels may be used to transmit data payload and secondary channels may increase the throughput of the dedicated channel.

The communication apparatuses may exchange 210, 220 information of their dedicated channels. The communication apparatuses may then communicate 230 simultaneously on the dedicated channels. A first apparatus communicating with another, second apparatus may comprise sending data frames, which may comprise signalling and/or user data, to the second apparatus and/or receiving data frames from the second apparatus. In step 230 the first apparatus may thus send and/or receive individually addressed data frames on at least two channels. Of these channels, one is the dedicated channel of the first apparatus and the other is a dedicated channel of the second apparatus. The dedicated channel of the second apparatus may be considered as a secondary channel in the first apparatus.

It will be appreciated that the simultaneous communication 230 may refer generally to at least partly simultaneous communication events at different channels. Such communication event may occur e.g. for the time a channel is reserved for the first apparatus and the second apparatus. Such communication events may involve, in a view of a single communication apparatus, transmission(s) and/or reception(s) of signaling and/or user data. For instance, in case of WLAN a communication event may be represented and defined by the network allocation vector (NAV) time, i.e. the time the channel is reserved after the frame transmission that contained the NAV time. As one example, the NAV time by a request to send signal (RTS), involving for a sender apparatus sending of the RTS, reception of clear to send signal (CTS), sending of user data, and reception of acknowledgement may be used to signal NAV time. Thus, it will be appreciated that during the simultaneous communication sending or reception operations at different channels at an apparatus naturally do not need to occur exactly at the same time. Simultaneous communication can exist at an area if the used (dedicated) channels are not overlapping.

Utilization of the features of FIG. 2 enables to further improve throughput in mesh networks, since the dedicated channels enable devices to organize simultaneous transmissions. It becomes possible to provide mutual exclusion between mesh points 10, i.e. colliding simultaneous transmissions at the dedicated channels from other devices may be avoided.

It will be appreciated that FIG. 2 is only an example of features that may be applied in a communications apparatus, such as a mesh point 10 of a mesh network, and various modifications and further features may be present. In one example variation there is a node storing information of dedicated channels of the communication apparatuses in centralized manner. Such node could be a specific management entity or one of the communication apparatuses applying dedicated channels. In this embodiment block 210 is not necessary, since the centralized node may already have this information, which may be even pre-configured. Furthermore, in step 210 the apparatus may receive the dedicated channel information from such node instead of the peer second communication apparatus. In one embodiment also the first dedicated channel among a set of available channels is determined 200 on the basis of a received message, e.g. a dedicated channel allocation message from the managing node. Some further example embodiments are illustrated below.

A communication apparatus implementing the method of FIG. 2 may be arranged to sense and maintain information on properties of at least some of the channels in the set of channels available for dedicated channel selection. This information may then be used to select 200 the dedicated channel. For instance, the MPs 10 may monitor use of air time allocation/availability.

The apparatus may receive beacon frames from neighborhood and monitor identities and the amount of devices that operate on channels. The apparatus may occasionally use dedicated channel(s) of other device(s) as its secondary channel. The apparatus may monitor and maintain channel-specific information of successfulness of transmission attempts. If the apparatus detects that transmissions in some secondary channel is often unsuccessful, the apparatus should avoid the usage of the channel and select (200) its dedicated channel among the channels that have had small amount of transmission errors.

A mesh topology typically transmits traffic to and from Internet. One device operates as mesh gate/mesh portal 20 and connects the Internet and the mesh network. Typically each device maintains the path to Internet, i.e. has knowledge that which device is the next in the path to Internet and which device is the mesh gate 20. The MPs 10 should avoid using the same dedicated channels as the device(s) with mesh gate 20 transmitting traffic to and from Internet. This is particularly important if the devices are located within one or two hops from the mesh gate 20. Similarly, if the apparatus detects that a device within two-hop neighborhood is congested, use of its dedicated channel should be avoided.

The apparatus may keep record of links from which it actively receives a data and of the links to which it actively transmits. For instance, links may be prioritized on the basis of amount of data transmitted or received. The apparatus may select its dedicated channels to be next to or close to the dedicated channel of these peers. The closely located dedicated channels simplify the transmission format and provide flexibility to select the secondary channels from wider range of frequencies.

Figure 3:
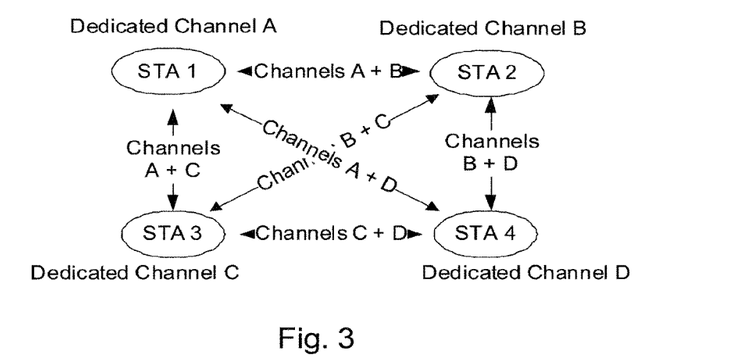
FIG. 3 illustrates use of dedicated channels according to an embodiment.

The apparatus, such as the MP 10, may use secondary channels together with the dedicated channels to further increase transmission bandwidth. An example of use of dedicated channels is shown in FIG. 3. Each device has its own dedicated channel, for instance the station STA1 selects a dedicated channel A and STA2 selects channel B. When communication between STA1 and STA2 is initiated, they also exchange information of their dedicated channels A, B. Then, e.g. the transmitter of STA1 uses (at least) its dedicated channel A and the target station's dedicated channel B in individually addressed data unit transmission.

The amount of possible simultaneous multi-channel communication events, referring generally to ongoing communication between apparatuses applying at least the dedicated channels of the apparatuses, is based on number of associated apparatuses and used dedicated channels. One may notice that simultaneous multi-channel communication events are possible, when a 2 or 3-hop neighborhood contains at minimum 4 apparatuses and each apparatus uses different dedicated channel. Four apparatuses may organize 2 simultaneous multi-channel communication events, i.e. each apparatus is either transmitter or receiver.

The maximum amount of simultaneous multi-channel communication events may be calculated with formula:

maximumAmount=Min(amount of channels, amount of apparatus)/2.

Table 1 illustrates the number of available simultaneous multi-channel communication events depending on currently available channels and neighboring apparatuses.

TABLE 1

Number of available simultaneous multi-channel communication events.

| Number of channels | Number of neighbor apparatuses | Number of available simultaneous multi-channel communication events |
|---|---|---|
| 1 | 1 | 1 |
| 2 | 2 | 1 |
| 3 | 3 | 1 |
| 4 | 4 | 2 |
| 5 | 5 | 2 |
| 6 | 6 | 3 |
| 7 | 7 | 3 |
| 8 | 8 | 4 |

The apparatus may scale the amount of secondary channels depending on the mesh BSS topology, i.e. if multiple devices operate in the same area and it is likely that many simultaneous transmissions occur at the same time, the apparatus should avoid using many secondary channels that overlap with dedicated channels or other devices.

Information on the dedicated channels may be transmitted 210, 220 in a broadcast message of the apparatus to locally advertise its presence, such as a WLAN beacon frame. The dedicated channel information may also be transmitted 210, 220 in a broadcast device discovery request and/or a response message to a broadcast device discovery request, such as a response to a discovery request or a WLAN probe request/response.

In some embodiments the indication of the dedicated channel is transmitted 210 on the dedicated channel, and the dedicated channel is detected 220 on the basis of the channel applied in the received message. For instance, the STA1 of FIG. 3 may transmit a broadcast message or a device discovery response message at its dedicated channel A, and a receiver of the STA2 then identifies channel A as the STA1's dedicated channel based on the channel of this received message. From the beacon the receivers detect the dedicated channel of the mesh STA.

However, in some embodiments the indication of the dedicated channel is included by a specific information element in one or more messages that may or may not be transmitted in the dedicated channel. For instance, the dedicated channel indication may be included in a beacon message transmitted at a secondary channel, if available at the time when the primary channel beacon is transmitted. In some embodiments the information on dedicated channels is transmitted on a (physical or logical) control channel that may be common to a plurality of radio devices and may be separate from the dedicated channels. The communication of dedicated channel information may involve one or more further devices, such as a node, a server and/or database maintaining dedicated channel information and providing this information to radio devices.

In one embodiment a communication apparatus, such as the MP 10, may be arranged to send a request on its secondary channel(s) to other apparatuses to provide their dedicated channels or information whether the secondary channel is their dedicated channel.

Some further examples of such information elements will be provided in the following example embodiments, but it is to be appreciated that the transmission of the dedicated channel indication is not limited to any specific message, protocol layer, or information element. For instance, various MAC or IP level data or management messages may be applied, such as MAC level management messages including measurement requests, responses and indications, and congestion control and channel allocation messages.

It is to be noted that the transmission 230 on both dedicated channels is not always possible, e.g. since a third device is currently transmitting on a dedicated channel. Thus, it will be appreciated that there may be a further check for availability of the dedicated channel(s) before block 230. For example, the first apparatus may be arranged to instantly send only on its (first) dedicated channel in response to detecting that this dedicated channel is free but the (second) dedicated channel of the second device is not free. Another example of such selective use of the dedicated channels is that if the dedicated channel of the first apparatus is not free and the dedicated channel of the second apparatus is free, whereby the first apparatus may instantly use only second channel (secondary channel for the first apparatus) for the transmission.

In one embodiment, the apparatus may implement a transmission buffer for one or more other apparatuses' dedicated channels. At a transmission opportunity initiation time, the apparatus may be arranged to transmit to peer apparatuses that have their dedicated channel idle. Thus, a frame which cannot be transmitted due to occupied dedicated channel of the second apparatus is not blocking the transmission to other apparatuses.

A communication apparatus implementing the method of FIG. 2, such as the MP 10, may comprise a data allocation controller allocating data units to applied channels, i.e. at least at the associated dedicated channels of the communicating apparatuses. There are various methods available for allocating data units or data flows to applied channels to increase capacity. For example, the allocation controller may be configured to allocate data units as evenly as possible to all applied channels. In the receiving side there may be a reassociation controller to control data units received from different channels to appropriate logical data flows. A further example is that the apparatus is arranged to send higher priority data on its dedicated channel and less relevant data on the secondary channel(s).

In some embodiments the MPs 10 of FIG. 1 are arranged to support IEEE 802.11s and/or IEEE 802.11ac features, IEEE 802.11ac working group is developing new physical and media access control (MAC) layer specifications to provide further improved throughput and multi-user MIMO.

In some embodiments the MPs 10 are IEEE 802.11s and/or 802.11ac mesh points applying enhanced distributed channel access (EDCA). EDCA provides a differentiated, distributed access to wireless medium for STAs using eight different user priorities. In EDCA shorter contention windows (CW) and shorter arbitration inter-frame spaces (AIFS) are applied for higher priority packets. EDCA provides contention-free access to a channel for a period called a Transmit Opportunity (TXOP). A TXOP is a bounded time interval during which an STA can send as many frames as possible (as long as the duration of the transmissions does not extend beyond the maximum duration of the TXOP). IEEE 802.11ac radios that operate within infrastructure BSS maintain NAV and CCA in the primary channel. The backoff calculation to obtain TXOP is performed in the primary channel. The secondary channels may carry data payload if they have been idle for arbitration interframe space (AIFS) duration at the time when a TXOP is obtained in the primary channel.

The current EDCA TXOP obtaining mechanism as defined in 802.11e and 802.11n is not capable to organize multiple transmissions simultaneously. The current mesh BSS as defined in 802.11s operates over 802.11n MAC and all devices in the mesh BSS operate in the same operating channel. The current 802.11ac assumes that every device is doing the contention based access in the same channel, the primary channel. Thus, a single transmission event in the primary channel blocks all other operations.

However, in the present embodiment and applying the above illustrated features, each 802.11ac radio device may use different channel for contention based access detection, herewith named as dedicated channel. Each device is assigned with a specific dedicated channel in which the device calculates CSMA/CA backoff. Transmission may then be performed at least on the dedicated channels of the transmitting and receiving devices. In addition to the dedicated channels zero or more secondary channels may be applied. By applying the above-indicated features illustrated in connection with FIG. 2, a new flexible EDCA configuration that enables simultaneous transmissions within a mesh network BSS has now been developed.

Figure 4:
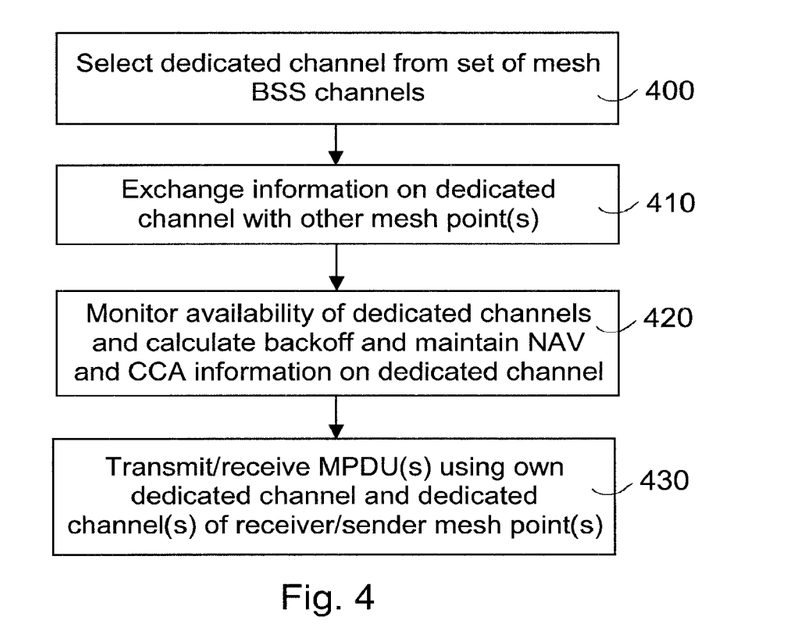
FIG. 4 illustrates a method according to an embodiment.

Referring also to FIG. 4, each 802.11ac MP in the mesh or independent BSS is associated 400 with its own dedicated channel. At initialization, an MP may carry out an active or passive scanning of neighbors by simple channel unification protocol (SCUP). If no neighbors are found, the MP can establish itself as the initiator of a mesh network. Each mesh BSS may define a set of channels in which each MP selects its dedicated channel. In MBSS the same set of channels is used in all MPs in the mesh BSS. A mesh BSS may have larger set of frequencies in use than what a MP may use in a single transmission.

For example, one device may use up to 8 channels simultaneously and mesh BSS may have 32 channels among which the 8 channels are selected. The MP may be arranged to select its dedicated channel based on the channel utilization or other criteria illustrated above, for instance.

In block 410 the MP exchanges dedicated channel information with one or more other MPs of the mesh network being established or joined to. This may involve transmission and reception of beacon or probe messages on the dedicated channel and/or comprising a specific information element indicating the dedicated channel, for instance. The MP stores the detected dedicated channel information of the one or more other MPs. In case a dedicated channel is changed in blocks 400 and 410, such change may be similar to change of an operation channel, i.e. it will require channel switch signaling and may have delay of several beacon periods to ensure that all peers and associated terminals receive the indication.

The MPs comprises a carrier sense/clear channel assignment (CS/CCA) functionality to detect the start of a network signal that can be received (CS) and to determine whether the channel is clear prior to transmitting a packet (CCA). NAV information indicates time periods when transmission onto the wireless medium will not be initiated by the MP, whether or not the CCA function senses that the wireless medium is busy.

As indicated in block 420, the MP may monitor all channels that are used by it or by its peer mesh STA(s). Each MP performs the CSMA/CA contention based TXOP obtaining, i.e. backoff calculation, in its own dedicated channel. The MP thus maintains NAV and CCA information in their dedicated channel. When the MP obtains TXOP in its dedicated channel it needs to ensure that the dedicated channel of the receiver is idle at the TXOP start time at least an arbitration interframe space (AFS) before the TXOP initiation time.

As indicated in block 430, two MPs are transmitted by using the dedicated channels of the both MPs on the basis of the dedicated channel, NAV and CCA related information.

Figure 5:
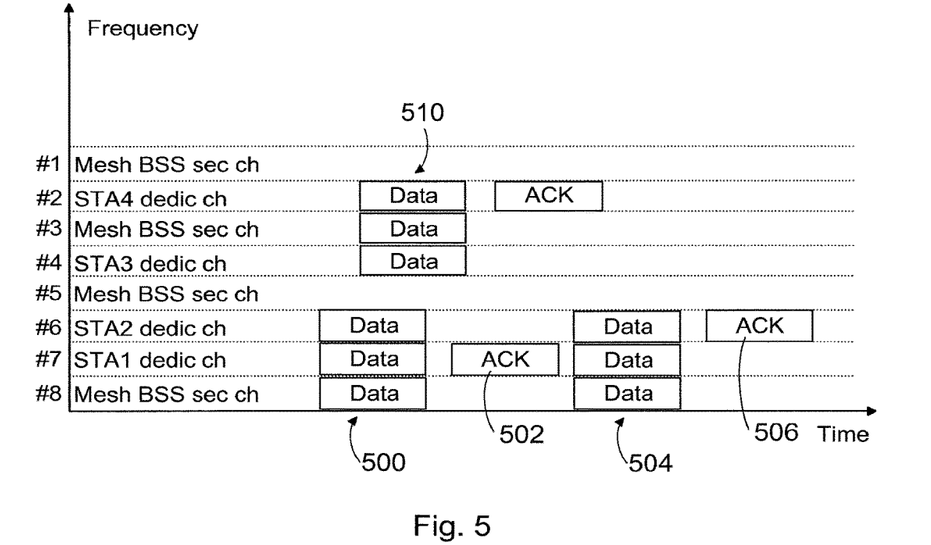
FIG. 5 illustrates use of the channels according to an embodiment.

FIG. 5 illustrates an example of simultaneous communication events in an 802.11ac mesh network. Example mesh points or stations STA1 and STA2 communicate 500 by using their dedicated channels #6 and #7 and a mesh BSS secondary channel #8. For example, STA2 sends user data to STA1, and the STA1 acknowledges 502 by its dedicated channel #7. Other mesh stations, STA3 and STA4, communicate 510 partly simultaneously on their dedicated channels #2, #4 and on a mesh BSS secondary channel #3 (since there is no overlap with dedicated channels of STA1 and STA2). However, on the basis of NAV information and sensed energy, STA3 and STA4 cannot use e.g. channel #6 as further secondary channel or transmit the data frame to STA1 or STA2 during their communication event 510, since their respective dedicated channels #6 and #7 are busy. STA1 and STA2 may continue with further data transmission 504 since the channels #6, #7, #8 continue to be available after the ACK 502. However, STA1 and STA2 cannot use channels #2-#4, which are still reserved by the communication between STA3 and STA4. For example, STA2 may transmit 504 data to the STA1, and the STA1 acknowledges 506 STA2's transmission on STA2's dedicated channel #6.

The MPs may monitor other devices' beacon messages indicating quality-of-service basic service set (QBSS) load element, i.e. use of air time in their dedicated channel. The MPs may monitor other channels while they transmit data and may maintain similar airtime allocation/availability characteristics.

Thus, the mesh BSS benefits from being capable to simultaneously transmit data within the neighborhood. Mutual exclusion between MPs may be provided. When more devices and channels are available, the simultaneous communication events become more likely.

In some embodiments one or more new information elements are added to WLAN discovery related frames, such as beacon messages and probe messages. A dedicated channel number field, which may be e.g. 1 octet in length, may be added to identify the last known channel number of the dedicated channel.

A regulatory class field, which may be e.g. 1 octet in length, may be added, if the dedicated channel operates in specific regulatory class. This field specifies the regulatory class in which the channel number is valid.

In one embodiment an indication of the physical layer protocol type is included. Such PHY type may indicate if the dedicated channel serves e.g. conventional 802.11g and/or 802.11n devices. Additional signalling/procedures may be applied to provide backward compatibility.

Probe responses and beacons may include at least the dedicated channel number field. Beacons may also contain a periodicity of the beacon transmission in the dedicated channel, indicating number of beacon periods when the beacon will be transmitted as the next time in the channel.

In one embodiment at least some of the above-illustrated features are applied for inter-AP communication, to arrange data exchange between neighboring APs over-the-air. When an AP transmits a physical layer convergence procedure protocol data unit (PPDU) to another AP, it may be arranged to use the primary channel of both APs for the transmission. The use of both primary channels enables mutual exclusion, i.e. blocking of all other transmissions, to both infrastructure BSSs. The transmitter may be arranged to place the transmitted message to the receiver's primary channel and to transmit a extra padding message, or the same message, at its own primary channel to maintain the channel reserved.

Thus, when APs transmit a PPDU by using the primary channel of both APs in the transmission, mutual exclusion may be established to both associated infrastructure BSSs, and the APs will receive traffic from each other.

In some embodiments at least some of the above-illustrated features are applied in a cognitive radio (CR) device, such as an IEEE 802.19.1 radio device. Such CR device may be arranged to communicate with other CR devices by applying the dedicated channel features and method of FIG. 2.

Figure 6:
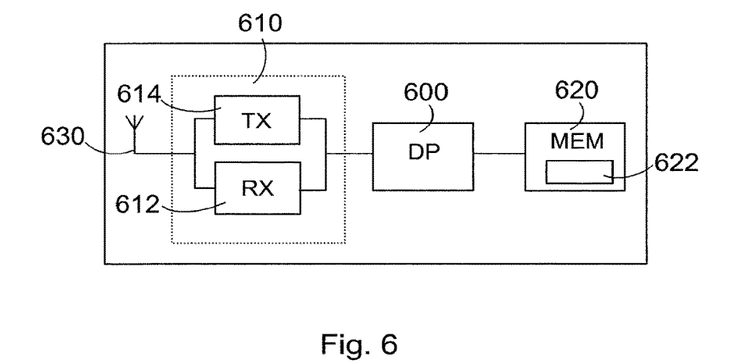
FIG. 6 illustrates an apparatus according to an embodiment.

FIG. 6 is a simplified block diagram of high-level elements of an apparatus according to an embodiment. The apparatus comprises a data processing element DP 600 with at least one data processor and a memory 620 storing a program 622. The apparatus may comprise at least one radio frequency transceiver 610 with a transmitter 614 and a receiver 612. The apparatus may be configured to function as the MP 10, such as an IEEE 802.11ac/s MR and carry out at least some of the functions illustrated above for the MP/apparatus.

The memory 620 may comprise a volatile portion and non-volatile portion and implemented using any suitable data storage technology suitable for the technical implementation context of the respective entity. The data processing element 600 may be of any type suitable to the local technical environment, and may include one or more of general purpose computers, special purpose computers (such as an application-specific integrated circuit (ASIC) or a field programmable gate array FPGA), microprocessors, digital signal processors (DSPs) and processors based on a multi-core processor architecture, as non-limiting examples.

In general, various embodiments of the presently disclosed features may be implemented by computer software stored in a computer-readable medium, such as the memory 620 and executable by the data processing element 600 of the apparatus, or by hardware (such as an ASIC), or by a combination of software and/or firmware and hardware in the apparatus.

In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 6. A computer-readable medium may comprise a computer-readable storage medium that may be any media or means that can contain or store the instructions for use by or in connection with an instruction execution system, apparatus, or device, such as a computer.

The program 622 may comprise computer program instructions that, when executed by a data processor 600, enable the apparatus to operate in accordance with at least some of embodiments of the present invention. The program may comprise computer program code configured to, with the at least one processor, cause the apparatus to perform at least some of the features illustrated in connection with FIGS. 1 to 5.

The apparatus could be in a form of a chip unit or some other kind of hardware module for controlling a radio device. The hardware module may form part of the device and could be removable. Some examples of such hardware module include a sub-assembly or an accessory device. For instance, a mobile communications device capable of mesh networking and functioning as the MP 10 of FIG. 1 may comprise the elements of FIG. 6. It will be appreciated that the apparatus may comprise various further elements, such as further processor(s), further communication unit(s), user interface components, a battery, a media capturing element, and a user identity module, not discussed in detail herein.

Although the apparatus and the data processing element 600 are depicted as a single entity, different features may be implemented in one or more physical or logical entities. There may be further specific functional module(s), for instance for carrying one or more of the features described in connection with FIGS. 2 to 4.

The apparatus of FIG. 6 may be arranged to use licensed and/or unlicensed bands. The apparatus may be arranged to support MIMO or multi-user MIMO and comprise a plurality of antennas and transceivers. It should be appreciated that the above-illustrated embodiments provide only examples of some radio technologies in which the features related to applying dedicated channels may be applied.

If desired, at least some of the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. A method, comprising:
   determining, by a first apparatus, a first dedicated channel of the first apparatus from a set of channels;
   receiving, by the first apparatus, an indication of a second dedicated channel of a second apparatus; and
   transmitting, by the first apparatus, data frames to the second apparatus at least partially simultaneously on the first dedicated channel and on the second dedicated channel, wherein the first apparatus and the second apparatus are mobile terminals, and wherein the second dedicated channel of the second apparatus is not the first dedicated channel of the first apparatus and the first dedicated channel of the first apparatus is not the second dedicated channel of the second apparatus.

2. The method of claim 1, further comprising transmitting an indication of the first dedicated channel to the second apparatus.

3. The method of claim 1, further comprising:

selecting the second dedicated channel for communication with the second apparatus based on receiving a message from the second apparatus on the second dedicated channel.

4. The method of claim 1, wherein the indication of the second dedicated channel is received in a broadcast message for local wireless device presence advertisement or a response to a broadcast device discovery request.

5. The method of claim 1, wherein the indication of the second dedicated channel is received in a beacon frame or a probe response message.

6. The method of claim 1, wherein the first dedicated channel is determined based on sensed channel utilization.

7. The method of claim 1, wherein the first apparatus and the second apparatus are mesh points.

8. The method of claim 7, wherein the first apparatus maintains information on dedicated channels of mesh points with which the first apparatus has peered, and the first apparatus monitors the first dedicated channel and the dedicated channels of the mesh points with which the first apparatus has peered.

9. The method of claim 1, wherein the first apparatus is a communications device comprising a transceiver for communicating according to an IEEE 802.11ac standard, and the set of channels are IEEE 802.11ac channels.

10. The method of claim 1, wherein the first dedicated channel is a frequency channel in which the first apparatus performs contention-based access to a wireless medium.

11. An apparatus, comprising: at least one processor; and at least one memory including computer program code,
the at least one memory and the computer program code configured to, with the at least one processor, cause the apparatus at least to:
determine a first dedicated channel of the apparatus from a set of channels,
receive an indication of a second dedicated channel of a second apparatus, and
transmit data frames to the second apparatus at least partially simultaneously on the first dedicated channel and on the second dedicated channel, wherein the apparatus and the second apparatus are mobile terminals, wherein the second dedicated channel of the second apparatus is not the first dedicated channel of the apparatus and the first dedicated channel of the apparatus is not the second dedicated channel of the second apparatus.

12. The apparatus of claim 11, wherein the at least one memory and the computer program code are further configured to, with the at least one processor, cause the apparatus at least to:
transmit an indication of the first dedicated channel to the second apparatus.

13. The apparatus of claim 11, wherein the at least one memory and the computer program code are further configured to, with the at least one processor, cause the apparatus at least to: receive the indication of the second dedicated channel in a message on the second dedicated channel, and
the apparatus is configured to select the second dedicated channel for communication with the second apparatus based on receiving the message comprising the indication of the second dedicated channel on the second dedicated channel.

14. The apparatus of claim 13, wherein the at least one memory and the computer program code are further configured to, with the at least one processor, cause the apparatus at least to: receive the indication of the second dedicated channel in a beacon frame or a probe response message.

15. The apparatus of claim 11, wherein the at least one memory and the computer program code are further configured to, with the at least one processor, cause the apparatus at least to: receive the indication of the second dedicated channel in a broadcast message for local wireless device presence advertisement or a response to a broadcast device discovery request.

16. The apparatus of claim 11, wherein the at least one memory and the computer program code are further configured to, with the at least one processor, cause the apparatus at least to: determine the first dedicated channel based on sensed channel utilization.

17. The apparatus of claim 11, wherein the apparatus and the second apparatus are mesh points.

18. The apparatus of claim 11, wherein the at least one memory and the computer program code are further configured to, with the at least one processor, cause the apparatus at least to: maintain information on dedicated channels of mesh points with which the apparatus has peered, and
the apparatus is configured to monitor the first dedicated channel and the dedicated channels of the mesh points with which the apparatus has peered.

19. The apparatus claim 11, wherein the apparatus is a communications device comprising a transceiver for communicating according to an IEEE 802.11ac standard, and the set of channels are IEEE 802.11ac channels.

20. The apparatus of claim 11, wherein the first dedicated channel is a frequency channel in which the apparatus performs contention-based access to a wireless medium.

* * * * *

UNITED STATES PATENT AND TRADEMARK OFFICE
CERTIFICATE OF CORRECTION

PATENT NO. : 10,104,659 B2
APPLICATION NO. : 15/192166
DATED : October 16, 2018
INVENTOR(S) : Jarkko Lauri Sakari Kneckt Page 1 of 1

It is certified that error appears in the above-identified patent and that said Letters Patent is hereby corrected as shown below:

On the Title Page

Under Assignee, item (73), Line 1:
Please delete "Nokia Techologies Oy" and insert --Nokia Technologies Oy--

In the Claims

On Column 12, Claim 19, Line 41:
Please delete "The apparatus claim 11" and insert --The apparatus of claim 11--

Signed and Sealed this
Twelfth Day of March, 2019

Andrei Iancu
*Director of the United States Patent and Trademark Office*